US012695506B2

(12) United States Patent    (10) Patent No.:    US 12,695,506 B2
Gholami et al.    (45) Date of Patent:    Jul. 28, 2026

(54) ALTERING REFRACTIVE INDEX OF AN EXPANDED BEAM CONNECTOR LENS

(71) Applicant: INTERNATIONAL BUSINESS MACHINES CORPORATION, Armonk, NY (US)

(72) Inventors: Faezeh Gholami, Ridgewood, NJ (US); Rafaela Frota, Poughkeepsie, NY (US); John S. Werner, Fishkill, NY (US); Andrew C. M. Hicks, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 18/525,157

(22) Filed: Nov. 30, 2023

(65) Prior Publication Data

US 2025/0184002 A1    Jun. 5, 2025

(51) Int. Cl.
*H04B 10/079* (2013.01)
*G02B 6/42* (2006.01)
*H04B 10/67* (2013.01)

(52) U.S. Cl.
CPC ....... *H04B 10/0795* (2013.01); *G02B 6/4206* (2013.01); *G02B 6/4225* (2013.01); *H04B 10/07955* (2013.01); *H04B 10/671* (2013.01)

(58) Field of Classification Search
CPC .......... H04B 10/0795; H04B 10/07955; H04B 10/671; G02B 6/4206; G02B 6/4225
USPC .................................................... 398/25, 213
See application file for complete search history.

(56) References Cited

U.S. PATENT DOCUMENTS

| | | | | |
|---|---|---|---|---|
| 5,594,580 | A | * | 1/1997 | Sakanaka ........... H04B 10/1125 |
| | | | | 398/31 |
| 5,627,669 | A | * | 5/1997 | Orino ................... H04B 10/118 |
| | | | | 398/129 |
| 6,071,016 | A | * | 6/2000 | Ichino ................. G02B 6/4225 |
| | | | | 385/92 |
| 6,762,875 | B2 | | 7/2004 | Samson |
| 2003/0031439 | A1 | * | 2/2003 | Iwasa ................. H04Q 11/0005 |
| | | | | 385/16 |
| 2003/0118841 | A1 | | 6/2003 | Horne et al. |
| 2004/0037538 | A1 | | 2/2004 | Schardt et al. |
| 2004/0258364 | A1 | * | 12/2004 | Frojdh ..................... G02B 6/32 |
| | | | | 385/74 |
| 2006/0175545 | A1 | * | 8/2006 | Lee ....................... H04N 9/3129 |
| | | | | 348/E9.026 |
| 2010/0244652 | A1 | | 9/2010 | Shaw et al. |
| 2011/0182575 | A1 | * | 7/2011 | Kuczynski ........... G02B 6/4206 |
| | | | | 398/28 |
| 2015/0362715 | A1 | * | 12/2015 | Kubo ..................... G02B 21/06 |
| | | | | 250/216 |
| 2017/0052329 | A1 | * | 2/2017 | Grinderslev ......... G02B 6/3874 |
| 2017/0371103 | A1 | * | 12/2017 | Chan ...................... G02B 6/262 |

* cited by examiner

*Primary Examiner* — Li Liu
(74) *Attorney, Agent, or Firm* — Onyx IP Group

(57) ABSTRACT

Methods, apparatus, and systems for altering refractive index of an expanded beam connector lens include receiving signals from an expanded beam connector, detecting a decibel loss of the signals in the expanded beam connector that exceeds a loss threshold, and directing, via a transmitter included in the expanded beam connector and in response to detecting the decibel loss, light at an expanding lens included in the expanded beam connector.

20 Claims, 5 Drawing Sheets

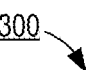

Computer 301

Processor Set 310

| Processing Circuitry 320 | Cache 321 |

Communication Fabric 311

Volatile Memory 312

Persistent Storage 313

| Operating System 322 | Transmitter Code 307 |

Peripheral Device Set 314

| UI Device Set 323 | Storage 324 | IoT Sensor Set 325 |

Network Module 315

WAN 302

End User Device 303

Remote Server 304

Remote Database 330

Private Cloud 306

Gateway 340

Public Cloud 305

| Cloud Orchestration Module 341 | Host Physical Machine Set 342 |
| Virtual Machine Set 343 | Container Set 344 |

FIG. 3

ALTERING REFRACTIVE INDEX OF AN EXPANDED BEAM CONNECTOR LENS

BACKGROUND

Field of the Disclosure

The field of the disclosure is optical cables, or, more specifically, methods and systems for altering refractive index of an expanded beam connector lens.

Description of Related Art

Optical cables connect to components, devices, or other cables via connectors. An expanded beam connector is one type of optic connector configured to expand the light signal coming from the optical cable using a lens included in the connector. Sometimes, the expanded signal coming from the lens may be misaligned and cause performance issues, such as an increased signal loss through the connector. Each connector has, associated with it, an expected decibel loss when a signal passes through the connector. However, when the expanded signal is misaligned with its intended target (such as another cable or component), the decibel loss through the connector can be much larger than expected, leading to performance issues. It would be beneficial to have a tunable expanded beam connector that can automatically correct such performance issues by bringing the decibel loss of the signal back down below the expected loss of the connector. Such an expanded beam connector could reduce equipment costs by increasing the lifespan of the connectors.

SUMMARY

Methods and systems for altering refractive index of an expanded beam connector lens according to various embodiments are disclosed in this specification. In accordance with one aspect of the present disclosure, a method of altering refractive index of an expanded beam connector lens may include receiving signals from an expanded beam connector, detecting a decibel loss of the signals in the expanded beam connector that exceeds a loss threshold, and directing, via a transmitter included in the expanded beam connector and in response to detecting the decibel loss, light at an expanding lens included in the expanded beam connector.

In accordance with another aspect of the present disclosure, altering refractive index of an expanded beam connector lens may include a system including a silicon chip and an expanded beam connector coupled to the silicon chip, where the expanded beam connector includes an expanding lens and a transmitter, where the system is configured to transmit, by the expanded beam connector, signals to the silicon chip, detect, by the silicon chip, a decibel loss of the signals in the expanded beam connector that exceeds a loss threshold, and direct, via the transmitter and in response to detecting the decibel loss, light at the expanding lens.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

BRIEF DESCRIPTION OF THE DRAWINGS

FIG. 3 is a block diagram of an example computing environment configured for altering refractive index of an expanded beam connector lens according to some embodiments of the present disclosure.

DETAILED DESCRIPTION

Figure 1:
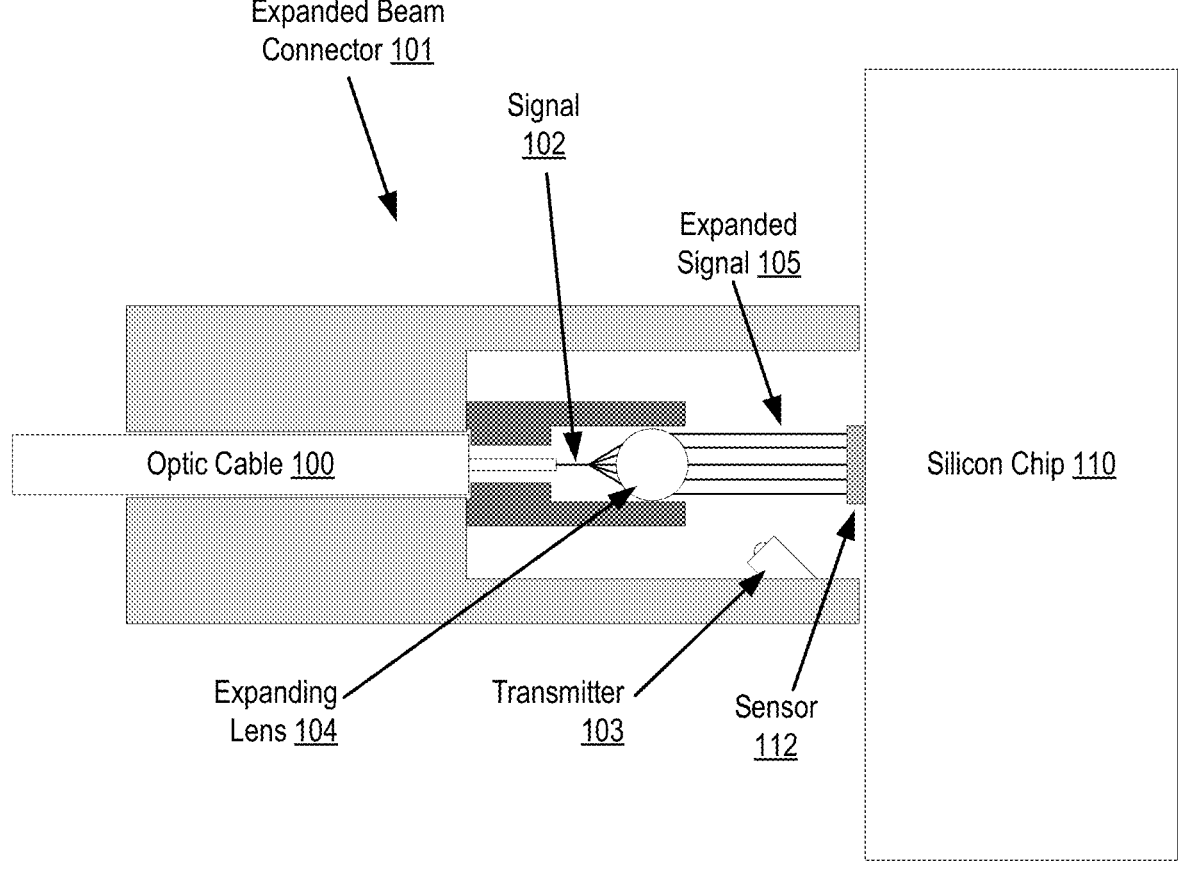
FIG. 1 shows a block diagram of an example system configured for altering refractive index of an expanded beam connector lens in accordance with embodiments of the present disclosure.

Exemplary methods, apparatus, and systems for altering refractive index of an expanded beam connector lens in accordance with the present disclosure are described with reference to the accompanying drawings, beginning with FIG. 1. FIG. 1 sets forth a block diagram of an example system configured for altering refractive index of an expanded beam connector lens in accordance with embodiments of the present disclosure. The example system of FIG. 1 includes an optical cable 100 coupled to a silicon chip 110 via an expanded beam connector 101. The example silicon chip of FIG. 1 is configured to receive signals (such as signal 102) from the optical cable 100 via the expanded beam connector 101. The silicon chip 110 incorporates a sensor 112 configured to detect the signals from the connector.

The example expanded beam connector 101 of FIG. 1 is configured to deliver signals from the optical cable 100 to a connected device or component that is coupled to the connector (such as silicon chip 110 in FIG. 1). The expanded beam connector 101 of FIG. 1 includes an expanding lens 104 and a transmitter 103 configured to direct light at the expanding lens. Expanded beam connectors are a contactless type of connector that uses a lens to expand and collimate light signals, expanding the signal from smaller fiber core size into a much larger diameter and sending the light signals in parallel to each other. If the expanded beam connector is coupled to another expanded beam connector (such as in a cable-to-cable connection), another lens refocuses the expanded beam back down to the fiber core size. When the expanded beam connector is coupled to a chip (as shown in FIG. 1), the expanded beam may be delivered directly to the silicon chip or silicon chip coupler structure (via a sensor on the silicon chip) without being refocused.

The expanding lens 104 in FIG. 1 is configured to expand the signal 102 from the optical cable 100 into an expanded signal 105, which is then delivered to the sensor 112 of the silicon chip 110. The example of FIG. 1 shows correct alignment between the expanded signal 105 and the sensor 112, where the entire signal arrives at the sensor. Any misalignment in the expanded signal due, due to the expanding lens 104, may cause performance issues due to increased signal loss. Each optical cable connector is expected to have a certain amount of signal loss (measured in decibels). A 'loss threshold' based on the expected signal loss is associated with each particular connector. If the expanded signal 105 is misaligned with the sensor, the decibel loss of the signal will be higher than the expected loss for the expanded beam connector 101. Such an increased decibel loss may negatively impact performance of the connector. Altering the refractive index of the expanding lens adjusts the alignment of the expanded signal in the expanded beam connector. The embodiments of the present disclosure describe various methods for altering the refractive index of the expanding lens in an attempt to correct any alignment issues in the connector, thereby preventing an increased signal loss through the connector. Such methods may be used when (or before) a connector is flagged for removal, allowing for the possibility of an increased lifespan for the connector.

Figure 2:
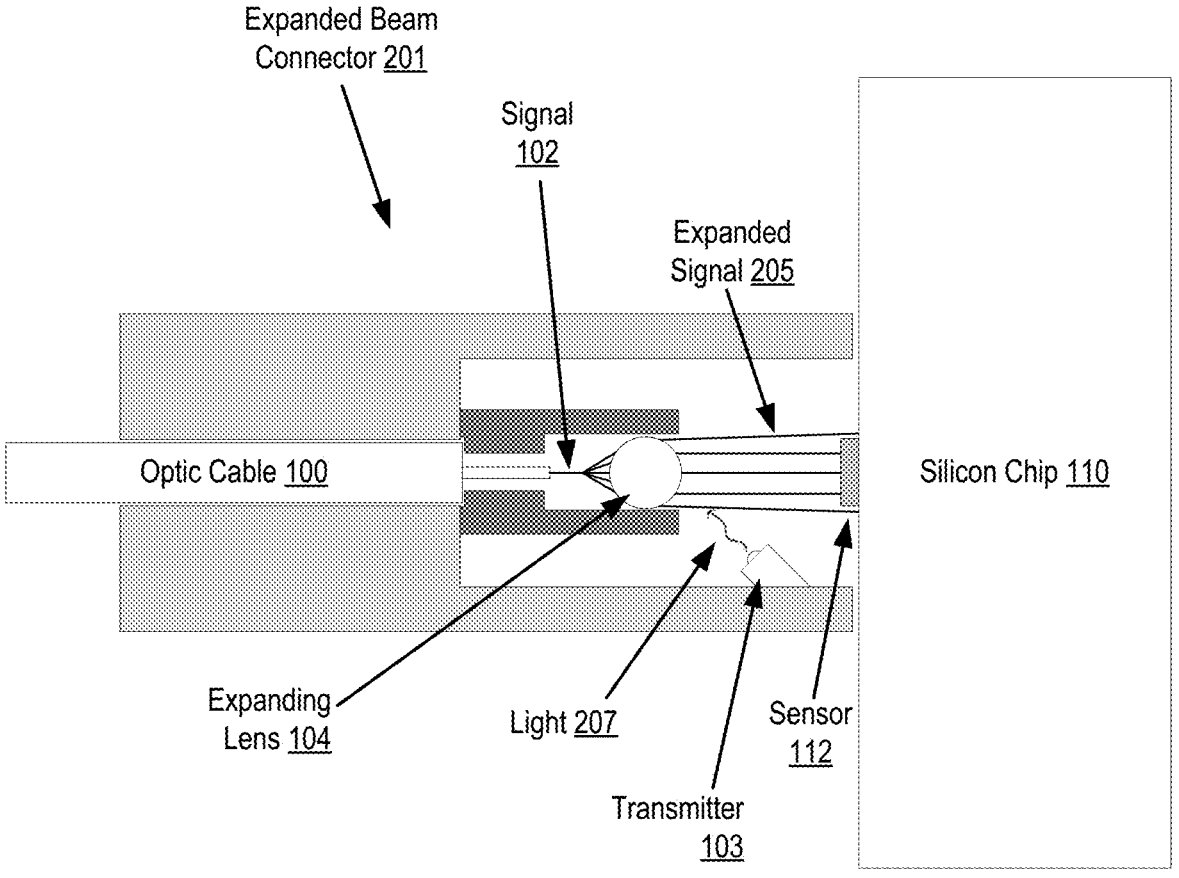
FIG. 2 shows a block diagram of another example system configured for altering refractive index of an expanded beam connector lens in accordance with embodiments of the present disclosure.

For further explanation, FIG. 2 sets forth a block diagram of another example system configured for altering refractive index of an expanded beam connector lens in accordance with embodiments of the present disclosure. The example system of FIG. 2 differs from the system of FIG. 1 in that the system of FIG. 2 shows the expanded signal 205 misaligned with the sensor 112 of the silicon chip 110. Specifically, the expanded signal is not properly aligned with the sensor 112, causing a portion of the expanded signal 205 to go undetected by the sensor 112 and thereby causing a significantly increased decibel loss when compared with the expanded beam connector 101 of FIG. 1. In one embodiment, the expanded beam connector 201 of FIG. 2 would likely be flagged for removal or replacement due to the performance-degrading signal loss in the connector. However, according to the embodiments of the present disclosure, the expanded beam connector 201 is configured with a transmitter 103 for attempting to correct the performance-degrading signal loss.

The example transmitter 103 of FIG. 2 is configured to direct light (such as light 207) at the expanding lens 104 to alter the refractive index of the lens. In one embodiment, the light is directed at the expanding lens when there are not any signals being transmitted through the expanded beam connector. In another embodiment, the light may be directed at the lens while signals are passing through the connector. By altering the refractive index of the lens, the transmitter may adjust the alignment of the expanded signal 105 in an attempt to correct the misalignment and thereby decrease the decibel loss experienced in the expanded beam connector. The expanded beam connector is configured to implement a variety of methods of using light to alter the refractive index of the expanding lens 104 within the expanded beam connector.

In one embodiment, the transmitter 103 is configured to direct ultraviolet (UV) light at the expanding lens 104. In such an embodiment, the expanding lens may be composed of a glass that has been doped to better absorb UV light. For example, the expanding lens may be composed of a germanium-doped glass (or any other type of doped glass configured to absorb UV light), allowing the lens to better absorb any UV light directed at it from the transmitter 103, thereby causing a change in the refractive index of the glass. Such a refractive index change within the glass is due to the photosensitivity of the doped glass in combination with the glass absorbing the UV light. In such an embodiment, the refractive index change of the expanding lens is a permanent change and may alter the alignment of the expanded signal 105 directed at the silicon chip's sensor 112.

The method of directing UV light at the expanding lens begins by directing an initial UV light test at the lens and then checking the decibel loss of the connector to determine whether directing light at the lens can correct the decibel loss. Such an initial UV light test may be carried out for a predetermined amount of time and at a specified intensity. Once the initial UV light test has been completed, the signal loss of the connector may again be determined and compared with the signal loss of the connector prior to the UV light. If the decibel loss for the connector has decreased but is still above the loss threshold (associated with the expected loss of the connector), then the method may continue by again directing UV light at the expanding lens until the decibel loss is below the loss threshold. In one embodiment, the UV light is continually directed at the lens, periodically rechecking the decibel loss of the connector, until the decibel loss has decreased below the loss threshold. In another embodiment, the UV light may be directed at the lens in separate individual bursts, checking the decibel loss after each burst of UV light, until the decibel loss has decreased below the loss threshold.

If the decibel loss for the connector has increased after the initial UV light test, the method ceases any further directing of UV light at the lens. Such an increase in the decibel loss after the initial UV light test may indicate that the refractive index has changed in the opposite direction relative to what the lens would require for fixing the alignment. In such an example, any continuation of directing UV light at the lens would likely only further increase the decibel loss of the connector. In such an example, the method may continue by flagging the connector with an indication that the expanded beam connector is misaligned (and experiencing performance issues) and that the connector has already attempted to correct the issue using UV light. Such an indication may also indicate that the connector should be replaced.

If the decibel loss for the connector has not changed after the initial UV light test, the method continues by again directing UV light at the expanding lens until the decibel loss changes. In one embodiment, the transmitter may increase the intensity of the UV light directed at the lens. In continuing with the method, once the decibel loss eventually changes, a determination is made whether the decibel loss has increased or decreased, and the method will continue respectively according to the method as described above. In one embodiment, the continued directing of UV light after no change to the decibel loss may be carried out only for a predetermined amount of time before eventually flagging the connector as unfixable according to the embodiments of the present disclosure. By carrying out the above described method, the expanded beam connector may automatically prolong its lifetime, preventing them from being prematurely replaced, thereby reducing equipment costs.

In an alternative embodiment, the transmitter 103 is configured to direct infrared (IR) light at the expanding lens 104. In such an embodiment, the lens does not have to be composed of a doped glass. Directing IR light at the expanding lens may alter the refractive index of the lens by increasing the temperature of the lens. Specifically, temperature of the glass may impact its refractive index as higher temperatures cause a decrease in the density of glass, thus decreasing the resultant refractive index of the glass, as light can travel faster in a less-dense medium. The transmitter 103 is configured to heat the lens by directing IR light towards it, thereby decreasing the refractive index of the expanding lens. In such an embodiment, the refractive index change is not permanent, as the refractive index will revert back to its original value as the lens cools back to room temperature. Accordingly, the transmitter may be configured to keep the lens at a desired temperature (and thus at a desired refractive index) by periodically directing IR light at the lens.

The example transmitter 103 of FIG. 2 may be configured to select which wavelength of light (ultraviolet or infrared) to direct at the expanding lens. For example, the transmitter may direct IR light at the lens after determining that directing UV light at the lens cannot correct the decibel loss of the connector. Alternatively, the transmitter may be configured to try to correct the loss with UV light after attempting to correct the loss with IR light. In one embodiment, information containing the details of the steps taken to correct the decibel loss may be stored in memory for future reference. For example, upon correcting a decibel loss in the expanded beam connector, the details of how much light was directed at the lens, the wavelength and intensity of the directed light, and any other related information, may be stored in memory to improve the efficiency of correcting future misaligned connectors.

For further explanation, FIG. 3 sets forth a block diagram of computing environment 300 configured for inspecting and cleaning optical interconnects in accordance with embodiments of the present disclosure. Computing environment 300 contains an example of an environment for the execution of at least some of the computer code involved in performing the inventive methods, such as transmitter code 307. In addition to transmitter code 307, computing environment 300 includes, for example, computer 301, wide area network (WAN) 302, end user device (EUD) 303, remote server 304, public cloud 305, and private cloud 306. In this example embodiment, computer 301 may be coupled to (or include) the silicon chip 110 of FIG. 1, and includes processor set 310 (including processing circuitry 320 and cache 321), communication fabric 311, volatile memory 312, persistent storage 313 (including operating system 322 and transmitter code 307, as identified above), peripheral device set 314 (including user interface (UI) device set 323, storage 324, and Internet of Things (IoT) sensor set 325), and network module 315. Remote server 304 includes remote database 330. Public cloud 305 includes gateway 340, cloud orchestration module 341, host physical machine set 342, virtual machine set 343, and container set 344.

Computer 301 may take the form of a desktop computer, laptop computer, tablet computer, smart phone, wearable computer, smart watch, mainframe computer, quantum computer or any other form of computer or mobile device now known or to be developed in the future that is capable of running a program, accessing a network or querying a database, such as remote database 330. As is well understood in the art of computer technology, and depending upon the technology, performance of a computer-implemented method may be distributed among multiple computers and/ or between multiple locations. On the other hand, in this presentation of computing environment 300, detailed discussion is focused on a single computer, specifically computer 301, to keep the presentation as simple as possible. Computer 301 may be located in a cloud, even though it is not shown in a cloud in FIG. 3. In such an embodiment, the computer 301 may be remotely coupled to the transmitter 103 of the expanded beam connector 101. On the other hand, computer 301 is not required to be in a cloud except to any extent as may be affirmatively indicated.

Processor set 310 includes one, or more, computer processors of any type now known or to be developed in the future. Processing circuitry 320 may be distributed over multiple packages, for example, multiple, coordinated integrated circuit chips. Processing circuitry 320 may implement multiple processor threads and/or multiple processor cores. Cache 321 is memory that is located in the processor chip package(s) and is typically used for data or code that should be available for rapid access by the threads or cores running on processor set 310. Cache memories are typically organized into multiple levels depending upon relative proximity to the processing circuitry. Alternatively, some, or all, of the cache for the processor set may be located "off chip." In some computing environments, processor set 310 may be designed for working with qubits and performing quantum computing.

Computer readable program instructions are typically loaded onto computer 301 to cause a series of operational steps to be performed by processor set 310 of computer 301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 321 and the other storage media discussed below. The program instructions, and associated data, are accessed by processor set 310 to control and direct performance of the inventive methods. In computing environment 300, at least some of the instructions for performing the inventive methods may be stored in transmitter code 307 in persistent storage 313.

Communication fabric 311 is the signal conduction path that allows the various components of computer 301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 312 is any type of volatile memory now known or to be developed in the future. Examples include dynamic type random access memory (RAM) or static type RAM. Typically, volatile memory 312 is characterized by random access, but this is not required unless affirmatively indicated. In computer 301, the volatile memory 312 is located in a single package and is internal to computer 301, but, alternatively or additionally, the volatile memory may be distributed over multiple packages and/or located externally with respect to computer 301.

Persistent storage 313 is any form of non-volatile storage for computers that is now known or to be developed in the future. The non-volatility of this storage means that the stored data is maintained regardless of whether power is being supplied to computer 301 and/or directly to persistent storage 313. Persistent storage 313 may be a read only memory (ROM), but typically at least a portion of the persistent storage allows writing of data, deletion of data and re-writing of data. Some familiar forms of persistent storage include magnetic disks and solid state storage devices. Operating system 322 may take several forms, such as various known proprietary operating systems or open source Portable Operating System Interface-type operating systems that employ a kernel. The code included in transmitter code 307 typically includes at least some of the computer code involved in performing the inventive methods.

Peripheral device set 314 includes the set of peripheral devices of computer 301. Data communication connections between the peripheral devices and the other components of computer 301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 323 may include components such as a display screen, speaker, microphone, wearable devices (such as goggles and smart watches), keyboard, mouse, printer, touchpad, game controllers, and haptic devices. Storage 324 is external storage, such as an external hard drive, or insertable storage, such as an SD card. Storage 324 may be persistent and/or volatile. In some embodiments, storage 324 may take the form of a quantum computing storage device for storing data in the form of qubits. In embodiments where computer 301 is required to have a large amount of storage (for example, where computer 301 locally stores and manages a large database) then this storage may be provided by peripheral storage devices designed for storing very large amounts of data, such as a storage area network (SAN) that is shared by multiple, geographically distributed computers. IoT sensor set 325 is made up of sensors that can be used in Internet of Things applications. For example, one sensor may be a thermometer and another sensor may be a motion detector.

Network module 315 is the collection of computer software, hardware, and firmware that allows computer 301 to communicate with other computers through WAN 302. Network module 315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 315 are performed on the same physical hardware device. In other embodiments (for example, embodiments that utilize software-defined networking (SDN)), the control functions and the forwarding functions of network module 315 are performed on physically separate devices, such that the control functions manage several different network hardware devices. Computer readable program instructions for performing the inventive methods can typically be downloaded to computer 301 from an external computer or external storage device through a network adapter card or network interface included in network module 315.

WAN 302 is any wide area network (for example, the internet) capable of communicating computer data over non-local distances by any technology for communicating computer data, now known or to be developed in the future. In some embodiments, the WAN 302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 303 is any computer system that is used and controlled by an end user (for example, a customer of an enterprise that operates computer 301) and may take any of the forms discussed above in connection with computer 301. EUD 303 typically receives helpful and useful data from the operations of computer 301. For example, in a hypothetical case where computer 301 is designed to provide a recommendation to an end user, this recommendation would typically be communicated from network module 315 of computer 301 through WAN 302 to EUD 303. In this way, EUD 303 can display, or otherwise present, the recommendation to an end user. In some embodiments, EUD 303 may be a client device, such as thin client, heavy client, mainframe computer, desktop computer and so on.

Remote server 304 is any computer system that serves at least some data and/or functionality to computer 301. Remote server 304 may be controlled and used by the same entity that operates computer 301. Remote server 304 represents the machine(s) that collect and store helpful and useful data for use by other computers, such as computer

301. For example, in a hypothetical case where computer 301 is designed and programmed to provide a recommendation based on historical data, then this historical data may be provided to computer 301 from remote database 330 of remote server 304.

Public cloud 305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 305 is performed by the computer hardware and/or software of cloud orchestration module 341. The computing resources provided by public cloud 305 are typically implemented by virtual computing environments that run on various computers making up the computers of host physical machine set 342, which is the universe of physical computers in and/or available to public cloud 305. The virtual computing environments (VCEs) typically take the form of virtual machines from virtual machine set 343 and/or containers from container set 344. It is understood that these VCEs may be stored as images and may be transferred among and between the various physical machine hosts, either as images or after instantiation of the VCE. Cloud orchestration module 341 manages the transfer and storage of images, deploys new instantiations of VCEs and manages active instantiations of VCE deployments. Gateway 340 is the collection of computer software, hardware, and firmware that allows public cloud 305 to communicate through WAN 302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 306 is similar to public cloud 305, except that the computing resources are only available for use by a single enterprise. While private cloud 306 is depicted as being in communication with WAN 302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 305 and private cloud 306 are both part of a larger hybrid cloud.

Figure 4:
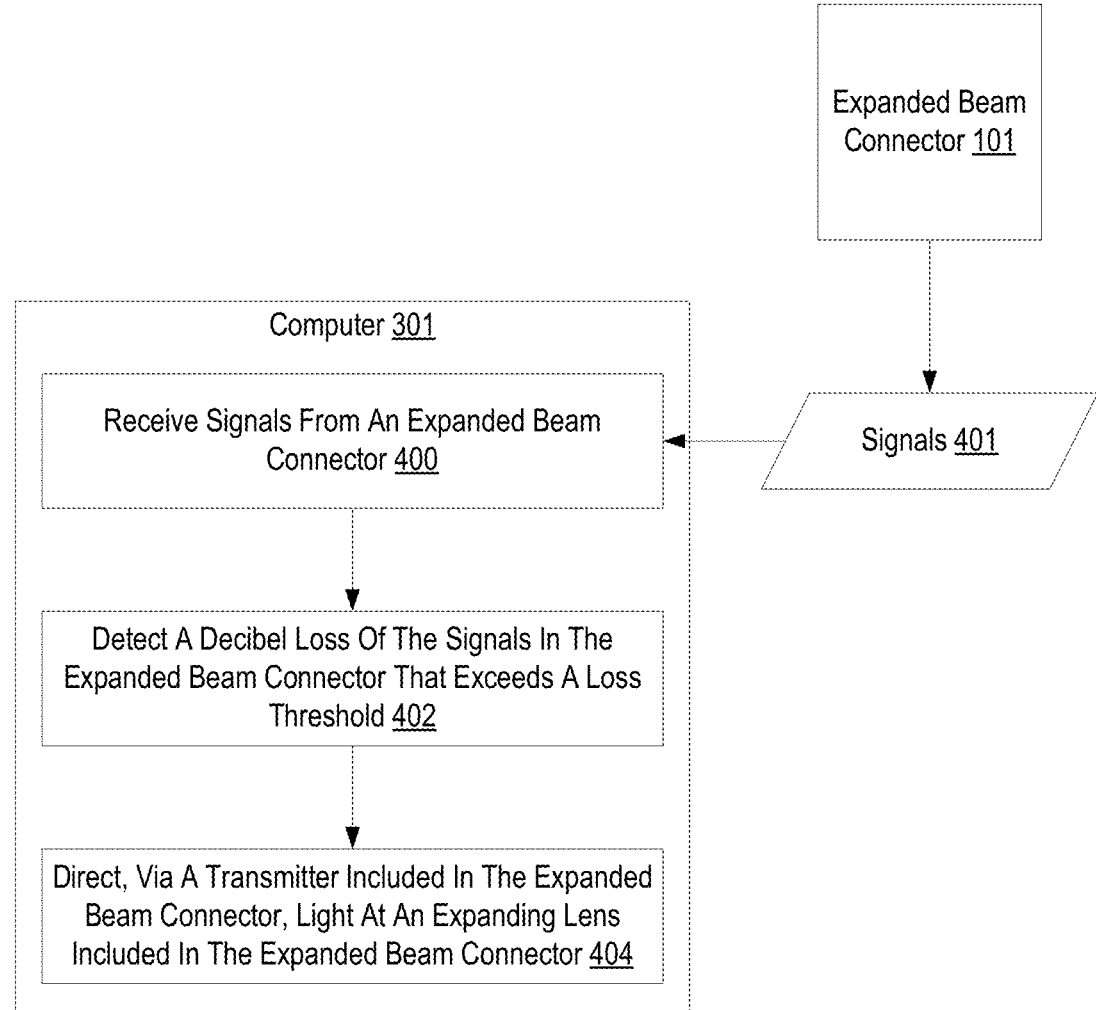
FIG. 4 is a flowchart of an example method for altering refractive index of an expanded beam connector lens according to some embodiments of the present disclosure.

For further explanation, FIG. 4 sets forth a flow chart illustrating an exemplary method of altering refractive index of an expanded beam connector lens according to embodiments of the present disclosure. The method of FIG. 4 includes receiving 400 signals from an expanded beam connector. Receiving 400 signals from an expanded beam connector may be carried out by computer 301 receiving the signals 401 from the expanded beam connector via a sensor (such as sensor 112 included in the silicon chip of FIG. 1). The signals 401 are light signals carrying information sent through optical cables.

The method of FIG. 4 also includes detecting 402 a decibel loss of the signals in the expanded beam connector that exceeds a loss threshold. Detecting 402 a decibel loss of the signals in the expanded beam connector that exceeds a loss threshold may be carried out by computer 301 determining that the power of the signal exiting expanded beam connector 101 differs from the power of the signal entering the expanded beam connector by an amount greater than a loss threshold. The loss threshold may be equal to, or a predetermined amount greater than, the expected loss of the expanded beam connector 101. Each connector is associated with an amount of loss expected for that specific connector. A loss threshold may be set at or slightly above the expected loss of the connector to detect (based on a comparison of the identified loss with the loss threshold) when the connector is experiencing performance issues.

The method of FIG. 4 also includes directing 404, via a transmitter included in the expanded beam connector, light at an expanding lens included in the expanded beam connector. Directing 404 light at an expanding lens included in the expanded beam connector may be carried out by the computer 301 sending instructions to the transmitter, or to a component or device controlling the transmitter, to direct light at the expanding lens. The instructions may include what type or wavelength of light to direct towards the lens (such as infrared or ultraviolet light), a specified intensity of the light, and a duration for how long to direct the light at the lens. In directing the light at the expanding lens, the computer is configured to alter the refractive index of the expanding lens in the expanded beam connector to help decrease the decibel loss for the connector.

Figure 5:
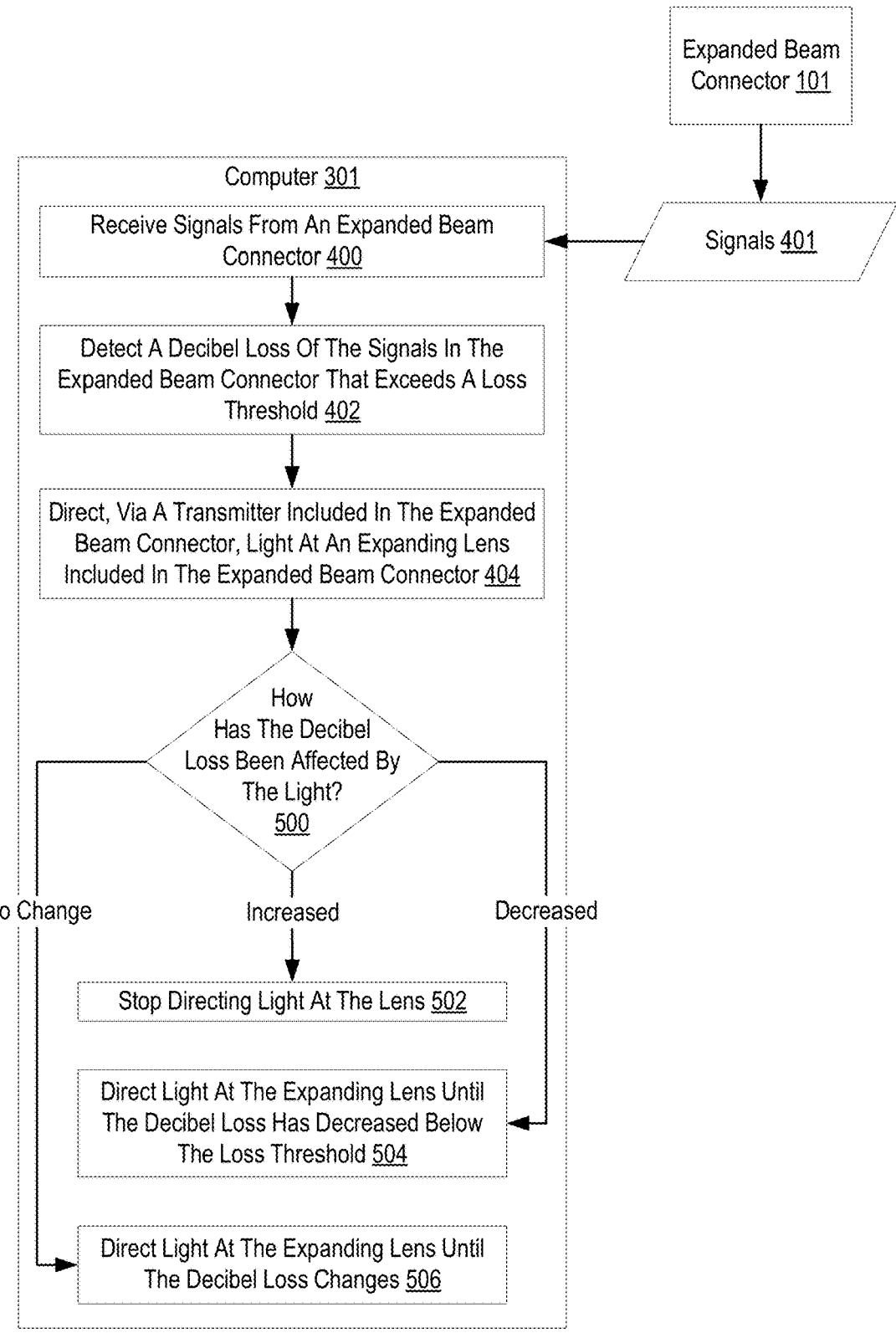
FIG. 5 is a flowchart of another example method for altering refractive index of an expanded beam connector lens according to some embodiments of the present disclosure.

For further explanation, FIG. 5 sets forth a flow chart illustrating another exemplary method of altering refractive index of an expanded beam connector lens according to embodiments of the present disclosure. The method of FIG. 5 differs from the method of FIG. 4 in that the method of FIG. 5 further includes determining 500 how the decibel loss been affected by the light. Determining 500 how the decibel loss been affected by the light may be carried out by the computer 301 rechecking the measured decibel loss in the expanded beam connector 101 and comparing it to the decibel loss of the connector that was measured prior to directing the light at the expanding lens. Such a determination of how the decibel loss was affected by the light initially directed at the lens allows the computer to select which subsequent actions should be taken.

The method of FIG. 5 also includes stopping 502, if the decibel loss has increased due to the directed light, the directing of light at the lens. Stopping 502 the directing of light at the lens may be carried out by the computer 301 sending instructions to the transmitter, or to a component or device controlling the transmitter, to stop directing light at the expanding lens. Such a determination that the initial directing of light at the lens caused the decibel loss of the connector to increase may indicate that the refractive index of the lens has been changed or shifted in the opposite direction required to correct the lens. In such an embodiment, the computer may instruct the transmitter to direct a different type of light (such as infrared if initially directing ultraviolet, or vice versa). In such an embodiment, the computer may flag the connector (or store a notification in memory) with an indication that the expanded beam connector is misaligned, and that the connector has already attempted to correct the issue using directed light. Such an indication may also indicate that the connector should be replaced.

The method of FIG. 5 also includes directing 504, if the decibel loss has decreased due to the directed light, light at the expanding lens until the decibel loss has decreased below the loss threshold. Directing 504 light at the expanding lens may be carried out by the computer 301 based on a determination that the decibel loss has decreased due to the initial directing of light at the lens but remains above the loss threshold. In such an embodiment, the computer may send instructions to continue directing light at the expanding lens, periodically rechecking the decibel loss of the connector, until the decibel loss has decreased below the loss threshold. In another embodiment, the computer may send instructions to continue directing individual bursts of light at the lens, checking the decibel loss after each time light is directed at the lens. In such an example, the computer uses the transmitter to direct light at the lens to correct the performance issues of the connector by adjusting the refractive index of the expanding lens.

The method of FIG. 5 also includes directing 506, if the decibel loss has not changed, light at the expanding lens until the decibel loss changes. Directing 506 light at the expanding lens until the decibel loss changes may be carried out by the computer 301 sending instructions for the transmitter to again direct light at the lens until the decibel loss for the connector changes from its initial value. In such an embodiment, once the decibel loss changes, the computer may, as explained above, carry out either step 502 or step 504 of FIG. 5 depending on whether the decibel loss has increased or decreased. In directing 506 light at the lens after the initial directing 404 of light, the computer 301 may instruct the transmitter to direct light at an increased intensity or for an increased duration of time, to increase the likelihood of changing the refractive index of the lens. The intensity or duration of the light being directed at the lens may be dependent on the type of light being transmitted (such as UV or IR light).

In view of the explanations set forth above, readers will recognize that the benefits of altering refractive index of an expanded beam connector lens according to embodiments of the present disclosure include:

Increasing the lifespan of an expanded beam connector by implementing methods that potentially correct alignment issues affecting connector performance, thereby also decreasing equipment costs (such as for replacement connectors).

Increasing performance by allowing for a tunable expanded beam connector that can automatically resolve performance issues within the connector.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for altering refractive index of an expanding lens, the method comprising:

receiving signals from an expanded beam connector;

detecting, by a sensor associated with the expanded beam connector, a decibel loss of the signals in the expanded beam connector that exceeds a loss threshold; and directing, via a transmitter included in the expanded beam connector and in response to detecting the decibel loss, light at the expanding lens included in the expanded beam connector, wherein the light is directed at the expanding lens to alter the refractive index of the expanding lens by:

increasing absorption of ultraviolet light by the expanding lens, or changing a temperature of the expanding lens.

2. The method of claim 1, further comprising determining whether the decibel loss has changed based on the directed light.

3. The method of claim 2, further comprising, if the decibel loss has decreased responsive to directing the light but remains above the loss threshold: again directing, via the transmitter, the light at the expanding lens until the decibel loss has decreased below the loss threshold.

4. The method of claim 2, further comprising, if the decibel loss has increased, stopping directing of light to the expanding lens.

5. The method of claim 2, further comprising, if the decibel loss has not changed, again directing, via the transmitter, the light at the expanding lens until the decibel loss has changed.

6. The method of claim 1, wherein the loss threshold is specific to the expanded beam connector.

7. The method of claim 1, wherein the expanding lens comprises a germanium-doped glass.

8. The method of claim 7, wherein the light directed at the expanding lens comprises ultraviolet light.

9. The method of claim 1, wherein the light directed at the expanding lens comprises infrared light.

10. A system for altering refractive index of an expanding lens, the system comprising:

a silicon chip; and an expanded beam connector coupled to the silicon chip, wherein the expanded beam connector includes:

the expanding lens; and a transmitter;

wherein the system is configured to:

transmit, by the expanded beam connector, signals to the silicon chip;

detect, by a sensor of the silicon chip, a decibel loss of the signals in the expanded beam connector that exceeds a loss threshold; and direct, via the transmitter and in response to detecting the decibel loss, light at the expanding lens, wherein the light is directed at the expanding lens to increase absorption of ultraviolet light by the expanding lens to alter the refractive index of the expanding lens, or wherein the light is directed at the expanding lens to change a temperature of the expanding lens to alter the refractive index of the expanding lens.

11. The system of claim 10, wherein the transmitter is positioned within the expanded beam connector and pointed towards the expanding lens.

12. The system of claim 10, wherein the silicon chip is further configured to determine whether the decibel loss has changed based on the directed light.

13. The system of claim 12, wherein the expanded beam connector is further configured to, if the decibel loss has decreased responsive to directing the light but remains above the loss threshold: again direct, via the transmitter, the light at the expanding lens until the decibel loss has decreased below the loss threshold.

14. The system of claim 12, wherein the expanded beam connector is further configured to, if the decibel loss has increased, stop directing the light to the expanding lens.

15. The system of claim 12, wherein the expanded beam connector is further configured to, if the decibel loss has not changed, again direct, via the transmitter, the light at the expanding lens until the decibel loss has changed.

16. The system of claim 10, wherein the loss threshold is specific to the expanded beam connector.

17. The system of claim 10, wherein the expanding lens comprises a germanium-doped glass.

18. The system of claim 17, wherein the light directed at the expanding lens comprises ultraviolet light.

19. The system of claim 10, wherein the light directed at the expanding lens comprises infrared light, and wherein the infrared light changes the temperature of the expanding lens.

20. An apparatus for altering refractive index of an expanding lens, the apparatus comprising:

a connector configured to couple to a silicon chip;

an expanding lens configured to expand a light signal for the silicon chip; and a transmitter configured to direct light at the expanding lens responsive to detecting a decibel loss of the light signal that exceeds a loss threshold, wherein the light is directed at the expanding lens to increase absorption of ultraviolet light or to change a temperature of the expanding lens, and wherein the refractive index, of the expanding lens, is altered based on increasing the absorption of ultraviolet light or based on changing the temperature of the expanding lens.

* * * * *